United States Patent

[11] 3,607,882

[72] Inventor Franz Wenger
 100 Memorial Drive, Apt. 8-7C,
 Cambridge, Mass. 02134
[21] Appl. No. 728,376
[22] Filed Feb. 29, 1968
[45] Patented Sept. 21, 1971

[54] PROCESS FOR PURIFYING ACETALS
 9 Claims, No Drawings

[52] U.S. Cl.................................................... 260/340,
 260/616, 260/338, 260/340.7, 260/340.9, 260/618
 R, 260/632 R, 260/617 R, 260/586, 260/591,
 260/592, 260/593 R
[51] Int. Cl......................................................C07c 43/30,
 C07d 19/00, C07d 17/00, C07d 15/04, C07d
 13/02, C07d 15/02

[50] Field of Search............................................ 260/340,
 616, 338, 340.7, 340.9

[56] References Cited
 UNITED STATES PATENTS
 3,410,760  11/1968  Craig et al. ................... 260/616 X Primary Examiner—Norma S. Milestone
Attorneys—Thomas J. Morgan and C. B. Barris

ABSTRACT: Acetals such as trioxane which contain impurities are purified by contacting them with an alkali metal ketyl such as one derived from benzophenone and p,p'-diphenylbenzophenone.

PROCESS FOR PURIFYING ACETALS

BACKGROUND OF THE INVENTION

The present invention relates to a process for the purification of impurity-containing acetals. More particularly, the present invention relates to a process for removing impurities such as water, formic acid and the like from trioxane by reacting the impurities with an alkali metal ketyl.

Trioxane, which is a cyclic trimer of formaldehyde, is normally manufactured by heating aqueous formaldehyde solutions in the presence of a strong mineral acid such as sulfuric acid. Unfortunately, the trioxane which is recovered therefrom contains impurities such as water, formic acid and methanol. It has been found that when the trioxane containing these impurities is polymerized, wither alone or with comonomers, most of the impurities act as chain transfer agents, thereby causing the resulting polymer product to have a lower molecular weight than desired. The molecular weight of the oxymethylene polymer decreases as the amount of these impurities contained in the trioxane monomer feed increases, and eventually polymerization is retarded.

The term "impurity" as used in the present specification and claims is meant to include water; oxygen; alcohols; ketones and aldehydes on which the acetals are based; and carboxylic acids and peroxides corresponding to the aldehydes. These impurities interfere with the cationic polymerization of the acetal, causing chain transfer reactions to occur. One or more of these impurities are normally contained in the acetals, primarily due to the method of their manufacture.

The presence of as little as 100 parts per million (p.p.m.) of such impurities in the trioxane monomer feed will cause sufficient chain transfer reactions to occur such that the molecular weight of the resulting oxymethylene polymer will not exceed about 130,000 (weight average molecular weight).

Heretofore, it has been attempted to purify the acetals such as trioxane by distillation and recrystallization. Such purification schemes, however, do not sufficiently reduce the amount of the impurities contained in the acetals and/or they are economically prohibitive on a commercial basis.

SUMMARY OF THE INVENTION

Accordingly, the primary object of the present invention is to provide an improved process for the removal of impurities from acetals such as trioxane.

Other objects of the present invention will be apparent from the following description.

In accordance with the present invention, acetals containing or having admixed therewith impurities are purified by reacting at least a portion of the impurities with at least one alkali metal ketyl, and thereafter separately recovering, from the residual reaction products, purified acetal containing less impurities than the feed acetal, and preferably essentially no impurities.

It has been found that the alkali metal ketyls are soluble in the acetals thereby forming a homogeneous phase for the purification. In addition, it has been found that the ketyls do not have an deleterious effect on the acetals such as prematurely initiating polymerization or affecting the subsequent polymerization of the purified and separately recovered acetal.

DETAILED DESCRIPTION OF THE INVENTION

The process of the present invention may be used to purify any acetal, cyclic or acyclic, which contains impurities.

Preferably, the acetals, cyclic and acyclic, which may be purified have a total of from 3 to 20 carbon atoms and contain at least one structural unit

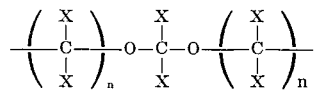

wherein $n$ is from 1 to 3, and X is either hydrogen or a hydrocarbon radical having from 1 to 6 carbon atoms and being of an aliphatic, cycloaliphatic or aromatic nature.

More preferably, the process is used to purify a. cyclic acteals having from 5 to about 11 atoms in the ring, the atoms in the ring being exclusively carbon atoms and oxygen atoms, and the oxygen atoms being bound to two carbon atoms, and b. acyclic acetals which contain the structural unit

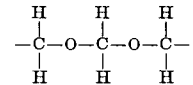

and have from 3 to 6 carbon atoms.

In most cases the acetals exclusively contain carbon atoms, hydrogen atoms and oxygen atoms.

Representative acetals which may be purified according to the present invention are trioxane; tetraoxane; 1, 3-dioxane; 4-phenyl-1, 3-dioxane; 4-methyl-1,3-dioxane; glycol-formal (1,3-dioxolane), 1,3,5-trioxacyclooctane); diglycol-formal (1,3,6-trioxacyclooctane); 1,4-butane-diolformal; 1,4-butenediol-formal; and the acyclic acetals methylal, methoxymethylal, and dimethoxymethylal.

The present purification process is especially suitable for acetals such as trioxane which is polymerizable by itself or can be copolymerized with other monomeric compounds, particularly other acetals.

The acetals may contain up to about 8 weight percent of the aforementioned impurities, based on the weight of the acetal, but normally contain from about 0.5 to 5 weight percent. Trioxane, for example, when produced from the aqueous formaldehyde solutions will contain in the range of from about 1 to 5 weight percent of such impurities as water, formaldehyde, methanol, and formic acid. Normally water and methanol are the predominant impurities.

By using the purification process of the present invention the impurity content of the acetal is reduced to below about 40 p.p.m., preferably below about 10 p.p.m., and more preferably essentially all of the impurities are removed. Thus, the resulting purified acetals such as trioxane may be polymerized to yield high molecular weight polymers due to the absence of these chain transfer agents.

The alkali metal ketyls which may be used in the present invention include the ketyls derived from aliphatic, cycloaliphatic and aromatic ketones, preferably from any of these ketones, preferably from any of these ketones which has a boiling point higher than the boiling point of the acetal to be purified and most preferably from an aromatic ketone having a higher boiling point.

The alkali metal ketyls are formed by reacting one or more of the alkali metals such as lithium, sodium potassium, rubidium, cesium, and francium, and preferably sodium or potassium with one of the above-mentioned ketones, for example, p,p'-diphenylbenzophenone, according to the following reaction

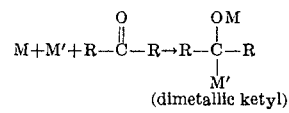
(dimetallic ketyl)

wherein M and M' are the same or different alkali metals, or

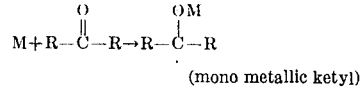
(mono metallic ketyl)

Suitable alkali metal ketyls are those derived from a. aliphatic ketones having from about 6 to 20 carbon atoms, and preferably 8 to 15 carbon atoms, for example, n-hexanone-2; -3; n-dodecanone-2; -3, etc., n-pentadeconone-2;

-3, etc., n-octadecanone-2; 3, etc., and n-eicosanone-2; -3, and the like.

b. cycloaliphatic ketones having from 5 to 12 carbon atoms, for example, cyclopentanone; camphor; cyclododecanone; cyclohexanone; 2;3; or 4-methylcyclopentanone-1, ethylcyclopentanones and the like. and c. aromatic ketones such as benzophenone; acetophenone; 4,4'-dimethylbenzophenone; acetonaphthalene; dinaphthyl ketone; p-diphenyl, phenyl ketone; p,p'-diphenylbenzophenone; and the like.

Preferably, the alkali metal ketyls which are employed in the present invention are disodium or dipotassium p,p'-diphenylbenzophenone, dipotassium benzophenone, disodium benzophenone and monosodium or monopotassium p,p'-diphenylbenzophenone.

The alkali metal ketyls may be contacted with the acetal to be purified in any conventional type of contacting or mixing vessel, either on a continuous, semicontinuous or batchwise basis such that the alkali metal keytl reacts with the impurities contained therein according to the following exemplary reactions;

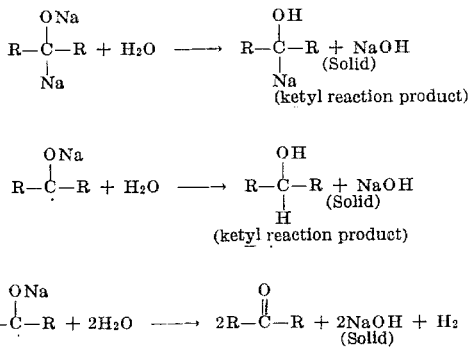

As can be seen from the above reactions the impurities are converted to alkali salts which are normally solids and thus can be easily separated from the acetal, for example, by sedimentation, filtration, distillation and the like. As previously mentioned, the ketone from which the alkali metal ketyl is derived preferably has a higher boiling point than the acetal to be purified. Hence, the resulting reaction mixture or product is normally subjected to a distillation treatment to separately recover the purified acetal, which contains preferably essentially no impurities.

The alkali metal ketyls may be reacted with the impurities contained in the acetals at any convenient temperature and pressure at which the acetal and the alkali metal ketyl are in the liquid state. Normally, temperatures of from about 65 to 200° C., and preferably from about 90° to 130° C. are employed.

While the temperature should be sufficiently high to keep the acetal and ketyl in the liquid state it should not be so high as to cause them to vaporize, unless a reflux contacting system is employed. Atmospheric pressure is preferred, however, if so desired, higher or lower pressures may be used. The impurities and ketyl are reacted in an atmosphere of an inert gas such as nitrogen, argon and the like in order to prevent oxidation of the ketyls.

Under the above reaction conditions a residence time of from about 10 minutes to 24 hours, and preferably ½ to 2 hours is sufficient to cause the impurities to react with the alkali metal ketyl so as to convert at least a portion and preferably essentially all of the impurities to solid alkali metal salts.

The amount of alkali metal ketyl employed depends on the amount of the impurities contained in the acetal. Generally, at least an equal molar amount of ketyl is added based on the mols of impurities, and preferably a slight excess of ketyl, for example, 10 to 20 mol percent. While higher amounts of ketyl may be used they do not offer any economical advantage.

The alkali metal ketyl may be added directly to the contacting or mixing vessel in contact or admixture with the acetal to be purified, but more advantageously the ketyl is formed in situ, for example, by adding the ketone and alkali metal separately to the vessel, whereby they immediately react to form the alkali metal ketyl, which in turn reacts with the impurities.

As previously mentioned, the acetals may contain as much as 8 weight percent of impurities. While the above-described ketyl purification treatment may be used to remove substantially all of these impurities it is desirable and economical to first subject the impurity-containing acetal to a preliminary distillation treatment to reduce the impurity content, preferably to below about 1 weight percent, based on the weight of the acetal, for example, to an amount in the range of from about 0.1 to 1 weight percent. The remaining impurities are then removed by reaction with an alkali metal ketyl.

The present invention is additionally illustrated by the following examples:

EXAMPLE I

Crude trioxane obtained via an aqueous formaldehyde solution and containing about 5 weight percent of impurities including 1.5 weight percent water, 1 weight percent formaldehyde, 0.5 weight percent formic acid, and 2 weight percent methanol, based on the trioxane, is subjected to a distillation treatment whereby the impurity content is reduced to 0.2 weight percent. The predistilled trioxane is then contacted with disodium p,p'-diphenylbenzophenone at a temperature of 115° C. and in the presence of an atmosphere of nitrogen, a homogeneous solution being formed. The sodium ketyl is formed in situ by adding sodium metal and the ketone separately. About a 10 percent molar excess of the ketyl is formed based on the amount of impurities contained in the trioxane.

The above mixture is refluxed under nitrogen for about 2 hours until a blue color persists. Pure trioxane, b.p. 114.3° C., is then obtained by distillation under nitrogen. The resulting product trioxane may be resublimed and remelted several times without detectable polymer formation, indicating the essential absence of impurities.

The purified trioxane can then be polymerized to yield oxymethylene polymers having a molecular weight of up to about 750,000 (number average).

EXAMPLE II

The same procedure is followed as in Example I, except that disodium benzophenone is used in place of disodium p,p'-diphenylbenzophenone. The resulting purified trioxane is essentially free of all impurities.

The same results are obtained when dipotassium p,p'-diphenylbenzophenone and dipotassium benzophenone are employed.

The principle, preferred embodiment, and mode of operation of the present invention have been described in the foregoing specification. However, the invention which is intended to be protected herein may be practiced otherwise than as described without departing from the scope of the appended claims.

I claim:

1. A process for purifying acetals selected from the group consisting of (a) cyclic acetals having from 5 to about 11 atoms in the ring, the atoms in the ring being exclusively carbon atoms and oxygen atoms, and the oxygen atoms being bound to two carbon atoms, and the substitutions on said carbon atoms being selected from the group consisting of hydrogen and hydrocarbon radicals having from 1 to 6 carbon atoms, and (b) acyclic acetals which contain the structural unit

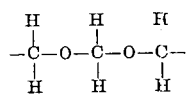

and have from 3 to 6 carbon atoms, wherein said acetal contains up to about 8 percent by weight, based on the acetal of at least one impurity selected from the group consisting of water; oxygen; alcohols ketones and aldehydes on which the acetals are based; and carboxylic acids and peroxides corresponding to the aldehydes, which process comprises contacting the impurity containing acetal with at least an equal molar amount of an alkali metal ketyl, based upon the moles of impurities, wherein the alkali metal ketyl is derived from an aliphatic, cycloaliphatic or aromatic ketone having a boiling point higher than the boiling point of the acetal being purified, in an inert gas atmosphere and at a temperature at which the acetal and alkali metal ketyl are in the liquid state, and thereafter recovering the purified acetal by distillation.

2. The process of claim 1 wherein the acetal contains from about 0.1 to about 5 weight percent of impurities based on the acetal.

3. The process of claim 2 wherein the impurity content is reduced from about 0.1 to about 1.0 weight percent, based on the acetal, to below 40 p.p.m.

4. The process of claim 3 wherein the ketyl is derived from an aromatic ketone having a higher boiling point.

5. The process of claim 4 wherein the amount of alkali metal ketyl used is from about 10 to about 20 mole percent more than the moles of impurities contained in the acetal.

6. The process of claim 5 wherein the temperature is from about 65° to about 200° C.

7. The process of claim 6 wherein the temperature is from about 90° to about 130° C.

8. The process of claim 7 wherein the acetal is trioxane and the purified trioxane contains below about 10 p.p.m. of impurities.

9. The process of claim 8 wherein the alkali metal ketyl is disodium p,p'diphenylbenzophenone.

PO-1050
(5/69)

UNITED STATES PATENT OFFICE
CERTIFICATE OF CORRECTION

Patent No. 3,607,882          Dated September 21, 1971

Inventor(s) Franz Wenger

It is certified that error appears in the above-identified patent and that said Letters Patent are hereby corrected as shown below:

In Column 2, line 21 "1,3,5-trioxacyclooctane" should read -- 1,3,5-trioxacycloheptane --

In Column 2, line 48 the words "preferably from any of these ketones" should be deleted.

In Column 2, line 75 insert before "n-dodecanone-2;" the words -- n-octanone-2; -3, etc.; --

Signed and sealed this 28th day of March 1972.

(SEAL)
Attest:

EDWARD M. FLETCHER, JR.          ROBERT GOTTSCHALK
Attesting Officer                Commissioner of Patents